US012615248B2

(12) United States Patent (10) Patent No.: US 12,615,248 B2

Godwin et al. (45) Date of Patent: Apr. 28, 2026

(54) SYSTEMS AND METHODS FOR PAIRING SITE CONTROLLER TO POINT-OF-SALE DEVICES

(71) Applicant: VeriFone, Inc., Wilmington, DE (US)

(72) Inventors: David Godwin, Palm Harbor, FL (US); Robert J. Hutzenbiler, Bradenton, FL (US)

(73) Assignee: VeriFone, Inc., Wilmington, DE (US)

( * ) Notice: Subject to any disclaimer, the term of this patent is extended or adjusted under 35 U.S.C. 154(b) by 198 days.

(21) Appl. No.: 18/703,606

(22) PCT Filed: Oct. 26, 2022

(86) PCT No.: PCT/US2022/078696
§ 371 (c)(1),
(2) Date: Apr. 22, 2024

(87) PCT Pub. No.: WO2023/076933
PCT Pub. Date: May 4, 2023

(65) Prior Publication Data
US 2025/0007903 A1 Jan. 2, 2025

Related U.S. Application Data

(60) Provisional application No. 63/263,089, filed on Oct. 27, 2021.

(51) Int. Cl.
*H04L 9/40* (2022.01)
*G06Q 20/20* (2012.01)

(52) U.S. Cl.
CPC ....... *H04L 63/0823* (2013.01); *G06Q 20/202* (2013.01); *H04L 63/0838* (2013.01)

(58) Field of Classification Search
CPC ............ H04L 63/0823; H04L 63/0838; G06Q 20/202
See application file for complete search history.

(56) References Cited

U.S. PATENT DOCUMENTS 8,646,060 B1 * 2/2014 Ben Ayed ............... H04W 4/20
726/9
2008/0183629 A1 7/2008 Kausik
(Continued)

FOREIGN PATENT DOCUMENTS

WO 2020082164 A1 4/2020

OTHER PUBLICATIONS

International Search Report and the Written Opinion of the International Searching Authority, PCT Application No. PCT/US2022/078696, pp. 1-7, dated Feb. 3, 2023.
(Continued)

*Primary Examiner* — Michael Pyzocha

(74) *Attorney, Agent, or Firm* — Bond, Schoeneck & King, PLLC

(57) ABSTRACT

Systems and methods for pairing a point-of-sale device (POS) to a site controller (SC) are provided. The method includes: (1) transmitting, from the POS to the SC, via a legacy communication channel, a start pairing command; (2) generating, via the SC, a one-time password upon receiving the start pairing command; (3) transmitting, via the legacy communication channel, the one-time password from the SC to the POS; (4) transmitting, from the POS to the SC, a host CSR; (5) transmitting, from the SC to the POS, a host certificate, and an SSH-CA public key; (6) transmitting, from the POS to the SC, a user CSR; (7) transmitting, from the SC to the POS, a user certificate; (8) storing, via a memory of the POS, the host certificate, the user certificate, and the SSH-CA public key; and (9) removing keys corresponding to the legacy communication channel from the POS.

20 Claims, 15 Drawing Sheets

(56)     References Cited

U.S. PATENT DOCUMENTS

| | | | |
|---|---|---|---|
| 2012/0179907 A1* | 7/2012 | Byrd | H04L 9/3268 |
| | | | 713/156 |
| 2012/0284193 A1* | 11/2012 | Bharghavan | H04L 9/3263 |
| | | | 705/16 |
| 2015/0222604 A1* | 8/2015 | Ylonen | H04L 9/14 |
| | | | 713/171 |
| 2016/0125376 A1 | 5/2016 | Beatty et al. | |
| 2016/0321638 A1* | 11/2016 | Cheng | G06Q 20/20 |
| 2016/0373882 A1* | 12/2016 | D'Angelo | G06Q 20/327 |
| 2017/0041151 A1 | 2/2017 | Kommireddy et al. | |
| 2017/0091762 A1 | 3/2017 | Rezayee et al. | |
| 2018/0167812 A1 | 6/2018 | Nagarajamoorthy et al. | |
| 2018/0262349 A1* | 9/2018 | Ranjan | H04L 9/3265 |
| 2018/0276664 A1* | 9/2018 | Peng | G06Q 20/206 |
| 2018/0315035 A1* | 11/2018 | Johnson | H04L 67/1051 |
| 2018/0374072 A1* | 12/2018 | Zhao | G06Q 20/00 |
| 2019/0295163 A1* | 9/2019 | Zurick | G06Q 40/03 |
| 2020/0021567 A1* | 1/2020 | Salgaonkar | H04L 9/14 |
| 2021/0203491 A1 | 7/2021 | Wei et al. | |
| 2021/0279703 A1* | 9/2021 | Abrams | G07F 7/0873 |

OTHER PUBLICATIONS

Communication Pursuant to Rules 70(2) and 70A(2) EPC, EP Patent Application No. 22888457.3, dated May 23, 2025, 1 page.
European Search Report, EP Patent Application No. 22888457.3, dated May 6, 2025, pp. 1-7.

* cited by examiner

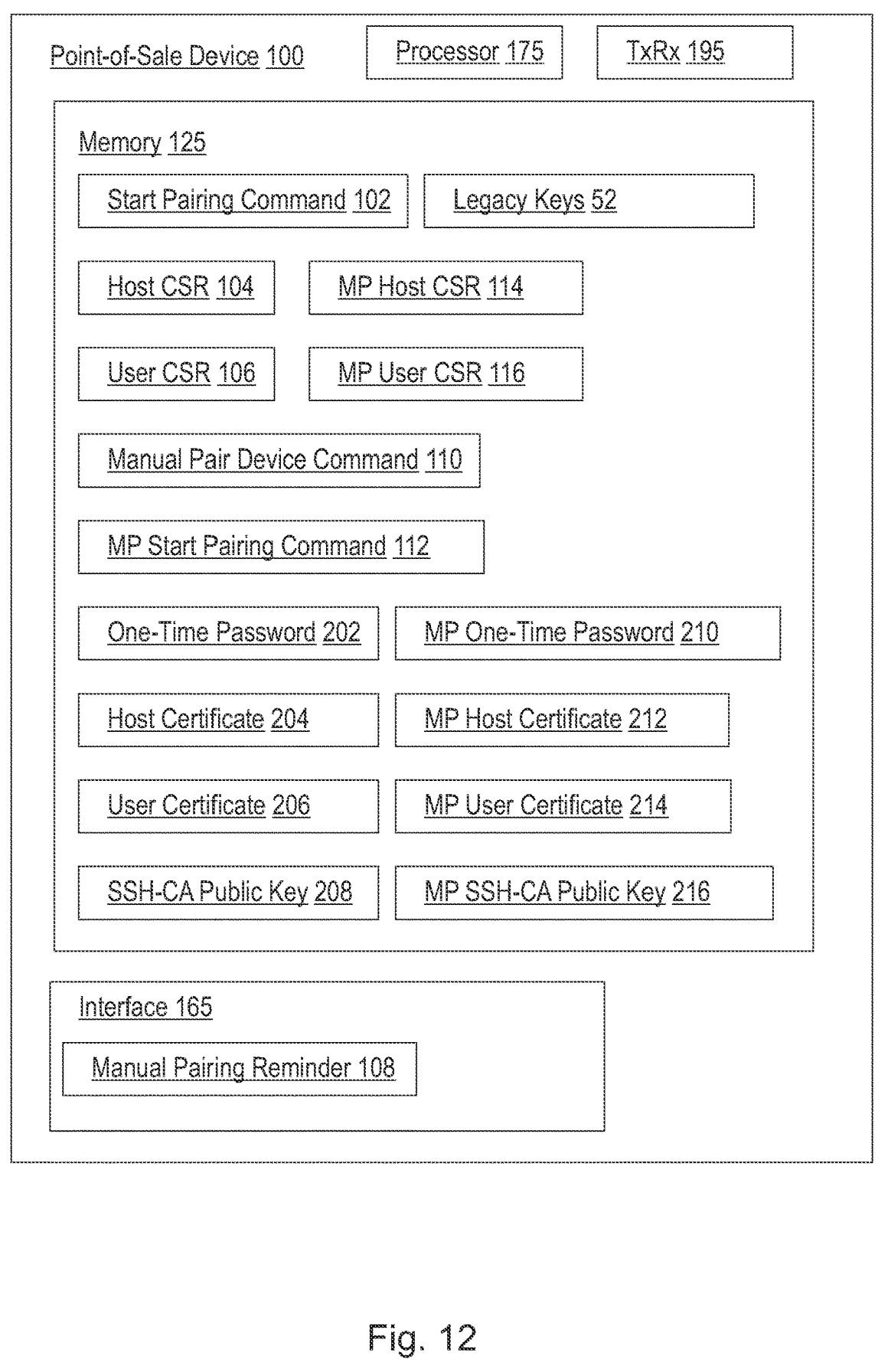

Point-of-Sale Device 100    Processor 175    TxRx 195

Memory 125

Start Pairing Command 102    Legacy Keys 52

Host CSR 104    MP Host CSR 114

User CSR 106    MP User CSR 116

Manual Pair Device Command 110

MP Start Pairing Command 112

One-Time Password 202    MP One-Time Password 210

Host Certificate 204    MP Host Certificate 212

User Certificate 206    MP User Certificate 214

SSH-CA Public Key 208    MP SSH-CA Public Key 216

Interface 165

Manual Pairing Reminder 108

Fig. 12

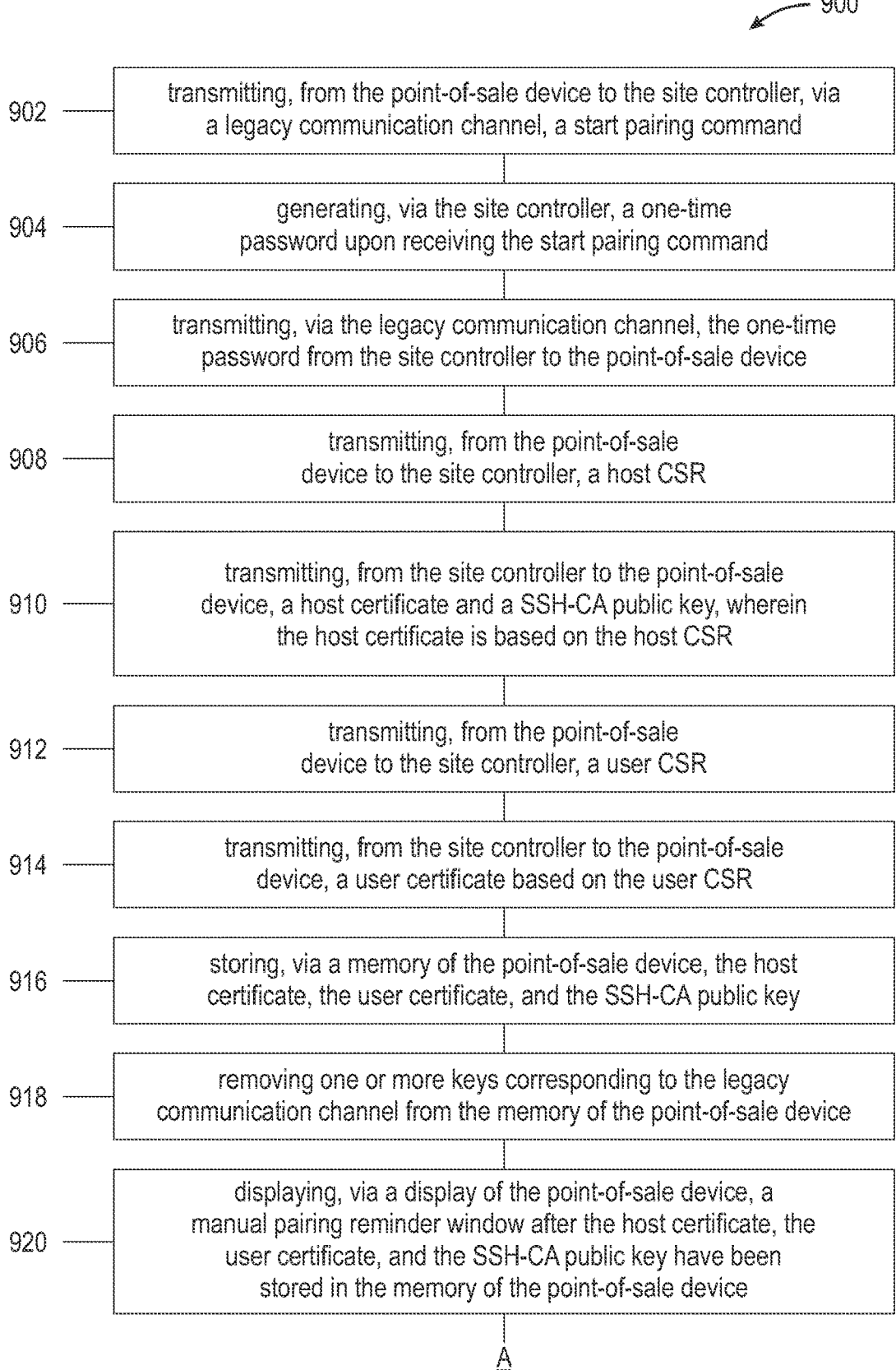

900

902 — transmitting, from the point-of-sale device to the site controller, via a legacy communication channel, a start pairing command 904 — generating, via the site controller, a one-time password upon receiving the start pairing command 906 — transmitting, via the legacy communication channel, the one-time password from the site controller to the point-of-sale device 908 — transmitting, from the point-of-sale device to the site controller, a host CSR 910 — transmitting, from the site controller to the point-of-sale device, a host certificate and a SSH-CA public key, wherein the host certificate is based on the host CSR 912 — transmitting, from the point-of-sale device to the site controller, a user CSR 914 — transmitting, from the site controller to the point-of-sale device, a user certificate based on the user CSR 916 — storing, via a memory of the point-of-sale device, the host certificate, the user certificate, and the SSH-CA public key 918 — removing one or more keys corresponding to the legacy communication channel from the memory of the point-of-sale device 920 — displaying, via a display of the point-of-sale device, a manual pairing reminder window after the host certificate, the user certificate, and the SSH-CA public key have been stored in the memory of the point-of-sale device

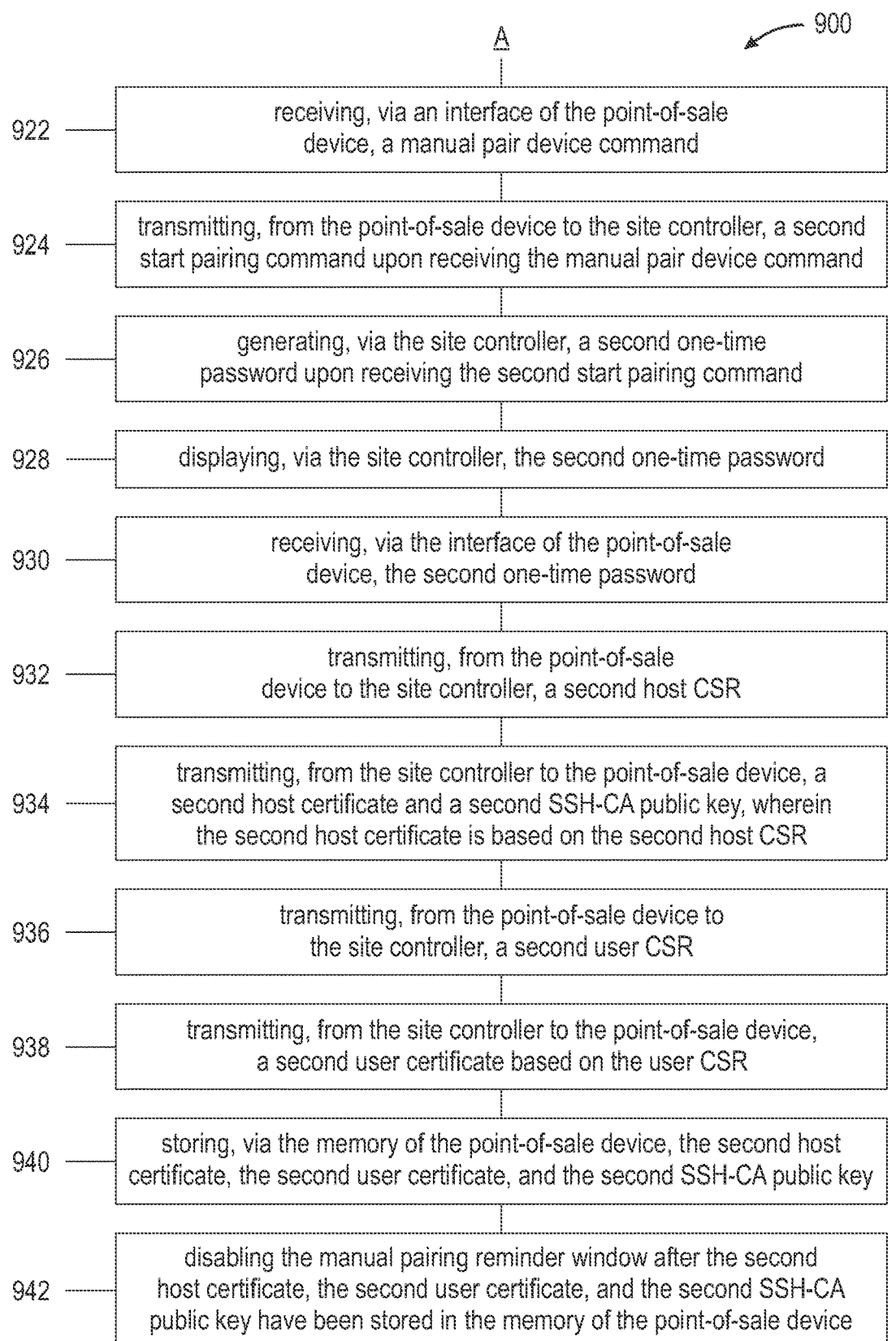

A

900

| | |
|---|---|
| 922 | receiving, via an interface of the point-of-sale device, a manual pair device command |
| 924 | transmitting, from the point-of-sale device to the site controller, a second start pairing command upon receiving the manual pair device command |
| 926 | generating, via the site controller, a second one-time password upon receiving the second start pairing command |
| 928 | displaying, via the site controller, the second one-time password |
| 930 | receiving, via the interface of the point-of-sale device, the second one-time password |
| 932 | transmitting, from the point-of-sale device to the site controller, a second host CSR |
| 934 | transmitting, from the site controller to the point-of-sale device, a second host certificate and a second SSH-CA public key, wherein the second host certificate is based on the second host CSR |
| 936 | transmitting, from the point-of-sale device to the site controller, a second user CSR |
| 938 | transmitting, from the site controller to the point-of-sale device, a second user certificate based on the user CSR |
| 940 | storing, via the memory of the point-of-sale device, the second host certificate, the second user certificate, and the second SSH-CA public key |
| 942 | disabling the manual pairing reminder window after the second host certificate, the second user certificate, and the second SSH-CA public key have been stored in the memory of the point-of-sale device |

Fig. 15

SYSTEMS AND METHODS FOR PAIRING SITE CONTROLLER TO POINT-OF-SALE DEVICES

CROSS-REFERENCE TO RELATED APPLICATIONS

The present application is a U.S. National Stage Application pursuant to 35 U.S.C. § 371 of International Patent Application Serial No. PCT/US2022/078696, filed Oct. 26, 2022, which claims priority to U.S. Provisional Patent Application No. 63/263,089, filed Oct. 27, 2021, entitled "Systems and Methods for Pairing Site Controller to Point-of-Sale Devices," the entireties of which are incorporated herein by reference.

FIELD OF THE DISCLOSURE

The present disclosure is directed generally to systems and methods for pairing point-of-sale devices to a site controller in retail store environments.

BACKGROUND

In-store payment environments may include one or more point-of-sale devices and a site controller. Cashiers utilize the point-of-sale devices to facilitate customer transactions, while the site controller manages the environment by communicating with each point-of-sale device. This communication can involve the site controller issuing commands to one or more of the point-of-sale devices, while also receiving various types of information from the point-of-sale devices. Each point-of-sale device must be paired to the site controller to enable this communication. For security purposes, this pairing is typically a manual process performed by an information technology professional or a similarly skilled and credentialed employee.

Point-of-sale devices and site controllers often require software upgrades. These software upgrades can be provided automatically to the site controller and point-of-sale devices. The software upgrades are then typically initiated by a store employee outside of normal business hours, such as during the late night and/or early morning. Following installation, the point-of-sale devices must be re-paired to the site controller. However, the store employees initiating the upgrade often lack the technical skills or administrative credentials to perform manual pairing. Failure to pair the point-of-sale devices to the site controller following the software upgrade can effectively disable the point-of-sale devices, leading to significant operational delays and loss of sales. Accordingly, there is a need in the art for an improved process to pair point-of-sale devices to a site controller following a software upgrade.

SUMMARY OF THE DISCLOSURE

The present disclosure is generally directed to systems and methods for pairing a site controller to one or more point-of-sale devices. In particular, the systems and methods enable the site controller to pair to the point-of-sale devices as part of an automatic software upgrade. Broadly speaking, the site controller receives a software upgrade. The software upgrade applies to the software of both the site controller and the point-of-sale devices. The site controller and point-of-sale devices were communicatively coupled prior to the initiation of the software upgrade via a legacy communication channel. The site controller first installs the software upgrade pertaining to its own software. The site controller then provides the relevant software upgrades to the point-of-sale devices. The point-of-sale devices install the software upgrades, requiring the point-of-sale devices to be paired with the site controller. The site controller then conveys a one-time password to the point-of-sale devices to pair the site controller to the point-of-sale devices. By automatically pairing the site controller to the point-of-sale devices following the installation of the upgrades, cashiers and other employees may operate the point-of-sale devices without manual pairing, thus reducing downtime.

However, this automatic pairing is less secure than manual pairing, as the automatic pairing relies on transmitting the one-time password over the legacy communications channel. Transmitting the one-time password over the legacy communications channel can be compromised through a variety of cyber-attacks. Accordingly, in one embodiment, the point-of-sale devices may display a manual pairing reminder window following the automatic pairing. Manual pairing is more secure than automatic pairing, as manual pairing generates new pairing credentials (such as a one-time password). Manual pairing then requires human intervention to retrieve the credentials from the built-in display interface of the site controller (or a corresponding controller client), and to enter the credentials at the point-of-sale device. Thus, a remote attacker would be unable to see the one-time password. Accordingly, manual pairing forms a "trusted relationship" between the point-of-sale device and the site controller.

This manual pairing reminder window may overlay the functional aspects of the point-of-sale device display interface screen, requiring a cashier to click-through the window to operate the point-of-sale device. The manual pairing reminder window may be configured to be displayed periodically (such as every 5 minutes), or in response to certain actions performed by the point-of-sale device (such as after a completed transaction) until a trusted relationship is established between the point-of-sale device and the site controller via manual pairing. This manual pairing reminder window is meant to remind the cashier to either perform the manual pairing themselves, or find a skilled and credentialed employee to perform the pairing. Once the manual pairing is performed, the display will no longer show the manual pairing window, as a trusted relationship has been established.

Generally, in one aspect, a point-of-sale device is provided. The point-of-sale device includes a memory. The memory stores one or more keys corresponding to a legacy communications channel. The point-of-sale device further includes a processor and a transceiver. The point-of-sale device is configured to transmit, via the transceiver over the legacy communication channel, a start pairing command to a site controller. The point-of-sale device is further configured to receive, via the transceiver over the legacy communication channel, a one-time password generated by the site controller. The point-of-sale device is further configured to generate, via the processor, a host certificate signing request (CSR) and a user CSR. The host CSR may be based on the one-time password. The user CSR may also be based on the one-time password. The point-of-sale device is further configured to transmit, via the transceiver, the host CSR and the user CSR to the site controller. The point-of-sale device is further configured to receive, via the transceiver, a host certificate corresponding to the host CSR, a user certificate corresponding to the user CSR, and a secure shell certificate authentication (SSH-CA) public key. The point-of-sale device is further configured to store the host certificate, the user certificate, and the SSH-CA public key in the memory. The point-of-sale device is further configured to remove the one or more keys corresponding to the legacy communication channel from the memory.

According to an example, the point-of-sale device may further include an interface. The interface is configured to display a manual pairing reminder window after the host certificate, the user certificate, and the SSH-CA public key have been stored in the memory.

According to an example, the point-of-sale device is further configured to receive, via an interface of the point-of-sale device, a manual pair device command. The point-of-sale device is further configured to transmit, via the transceiver, a second start pairing command to the site controller upon receiving the manual pair device command. The point-of-sale device is further configured to receive, via the interface, a second one-time password. The point-of-sale device is further configured to generate, via the processor, a second host CSR and a second user CSR. The point-of-sale device is further configured to transmit, via the transceiver, the second host CSR and the second user CSR to the site controller. The point-of-sale device is further configured to receive, via the transceiver, a second host certificate corresponding to the second host CSR, a second user certificate corresponding to the second user CSR, and a second SSH-CA public key. The point-of-sale device is further configured to store the host certificate, the user certificate, and the second SSH-CA public key in the memory.

According to an example, the point-of-sale device is further configured to disable the manual pairing reminder window after the second host certificate, the second user certificate, and the second SSH-CA public key have been stored in the memory.

According to an example, the second host CSR is based on the second one-time password. According to a further example, the second user CSR is based on the second one-time password.

Generally, in another aspect, a site controller is provided. The site controller includes a memory storing one or more keys corresponding to a legacy communications channel. The site controller further includes a processor and a transceiver.

The site controller is configured to receive, via the transceiver over the legacy communication channel, a start pairing command from a point-of-sale device. The site controller is further configured to generate, via the processor, a one-time password upon receiving the start pairing command. The site controller is further configured to transmit, via the transceiver over the legacy communication channel, the one-time password to the point-of-sale device. The site controller is further configured to receive, via the transceiver, a host CSR and a user CSR from the point-of-sale device. The host CSR may be based on the one-time password. The user CSR may be based on the one-time password. The site controller is further configured to generate, via the processor, a host certificate based on the host CSR. The site controller is further configured to generate, via the processor, a user certificate based on the user CSR. The site controller is further configured to transmit, via the transceiver, the host certificate, the user certificate, and an SSH-CA public key to the point-of-sale device.

According to an example, the site controller is further configured to receive, via the transceiver, a second start pairing command from a point-of-sale device. The second start pairing command corresponds to a user providing a manual pair device command to the point-of-sale device. The site controller is further configured to generate, via the processor, a second one-time password upon receiving the second start pairing command. The site controller is further configured to display the second one-time password. The site controller is further configured to receive, via the transceiver, a second host CSR and a second user CSR from the point-of-sale device. The site controller is further configured to generate, via the processor, a second host certificate based on the host CSR. The site controller is further configured to generate, via the processor, a second user certificate based on the user CSR. The site controller is further configured to transmit, via the transceiver, the second host certificate, the second user certificate, and a second SSH-CA public key to the point-of-sale device.

According to an example, the second host CSR is based on the second one-time password. Further to this example, the second user CSR is based on the second one-time password.

Generally, in another aspect, a method for pairing a point-of-sale device to a site controller is provided. The method includes transmitting, from the point-of-sale device to the site controller, via a legacy communication channel, a start pairing command. The method further includes generating, via the site controller, a one-time password upon receiving the start pairing command. The method further includes transmitting, via the legacy communication channel, the one-time password from the site controller to the point-of-sale device. The method further includes transmitting, from the point-of-sale device to the site controller, a host CSR. The method further includes transmitting, from the site controller to the point-of-sale device, a host certificate, and an SSH-CA public key. The host certificate is based on the host CSR. The method further includes transmitting, from the point-of-sale device to the site controller, a user CSR. The method further includes transmitting, from the site controller to the point-of-sale device, a user certificate based on the user CSR. The method further includes storing, via a memory of the point-of-sale device, the host certificate, the user certificate, and the SSH-CA public key. The method further includes removing one or more keys corresponding to the legacy communication channel from the memory of the point-of-sale device.

According to an example, the host CSR and the user CSR are based on the one-time password.

According to an example, the method further includes displaying, via an interface of the point-of-sale device, a manual pairing reminder window after the host certificate, the user certificate, and the SSH-CA public key have been stored in the memory of the point-of-sale device.

According to an example, the method further includes receiving, via an interface of the point-of-sale device, a manual pair device command. The method further includes transmitting, from the point-of-sale device to the site controller, a second start pairing command upon receiving the manual pair device command. The method further includes generating, via the site controller, a second one-time password upon receiving the second start pairing command. The method further includes displaying, via the site controller, the second one-time password. The method further includes receiving, via the interface of the point-of-sale device, the second one-time password. The method further includes transmitting, from the point-of-sale device to the site controller, a second host CSR. The method further includes transmitting, from the site controller to the point-of-sale device, a second host certificate and a second SSH-CA public key, wherein the second host certificate is based on the second host CSR. The method further includes transmitting, from the point-of-sale device to the site controller, a second user CSR. The method further includes transmitting, from the site controller to the point-of-sale device, a second user certificate based on the user CSR. The method further includes storing, via the memory of the point-of-sale device, the second host certificate, the second user certificate, and the second SSH-CA public key.

According to an example, the second host CSR and the second user CSR are based on the one-time password.

According to an example, the method further includes disabling the manual pairing reminder window after the second host certificate, the second user certificate, and the second SSH-CA public key have been stored in the memory of the point-of-sale device.

In various implementations, a processor or controller may be associated with one or more storage media (generically referred to herein as "memory," e.g., volatile and non-volatile computer memory such as RAM, PROM, EPROM, EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 12 is a schematic diagram of a point-of-sale device, in accordance with an example.

FIG. 14 is a flowchart of a method for pairing a point-of-sale device to a site controller, in accordance with an example.

FIG. 15 is a further flowchart of the method for pairing a point-of-sale device to a site controller, in accordance with an example.

DETAILED DESCRIPTION OF EMBODIMENTS

Figure 1:
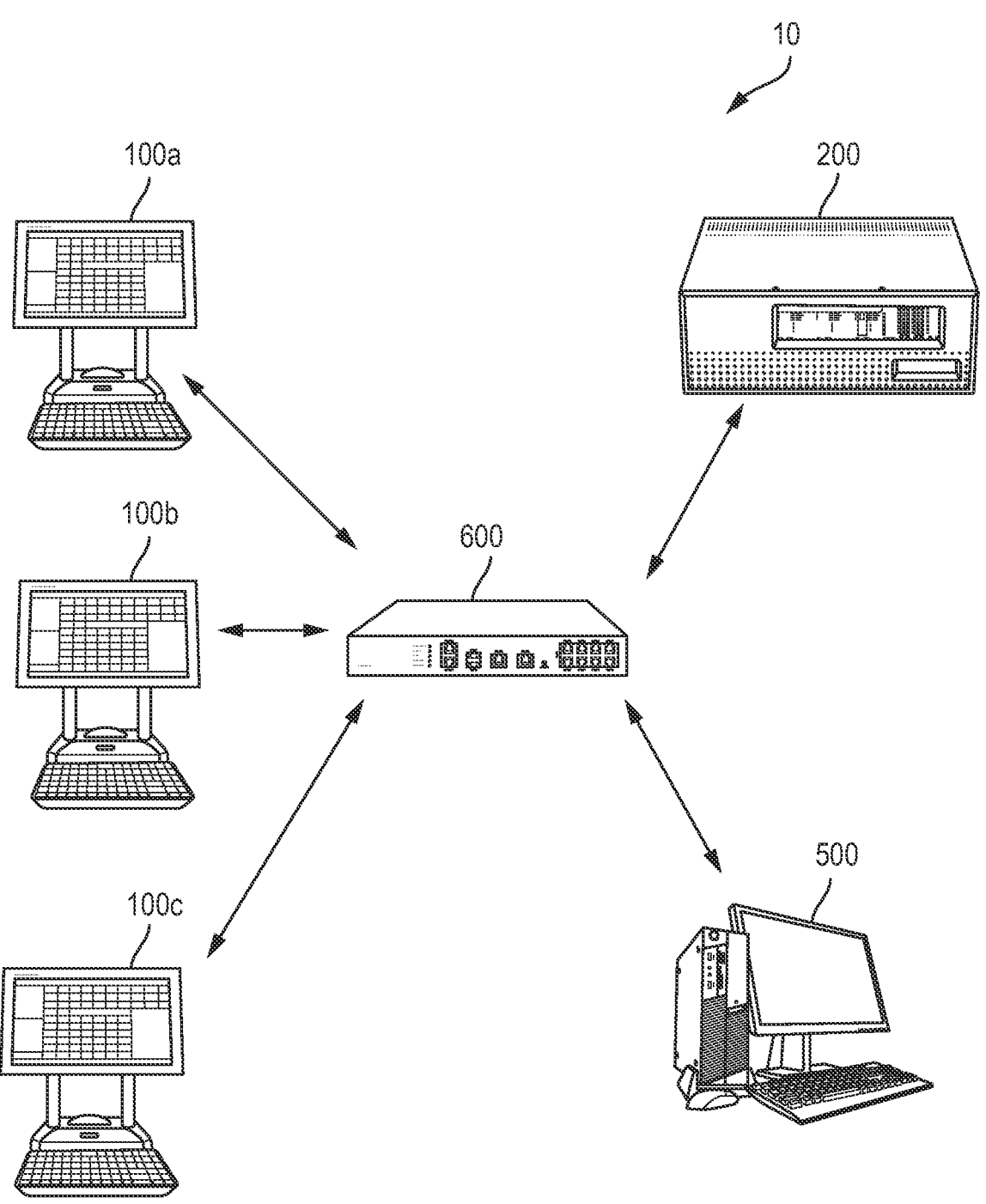
FIG. 1 is a system diagram of a payment system, in accordance with an example.

FIG. 1 illustrates a payment system 10. The payment system 10 includes three point-of-sale devices 100*a*, 100*b*, 100*c*, a site controller 200, a controller client 500, and a site router 600. The point-of-sale devices 100*a*-100*c* are operated by cashiers or other store employees to facilitate customer transactions. As shown in FIG. 12, the point-of-sale devices 100 may include a memory 125, an interface 165, a processor 175, and a transceiver 195. The interface 165 may include a display screen. In some examples, the point-of-sale devices 100*a*-100*c* may be configurable to operate in a self-checkout mode. In the self-checkout mode, the point-of-sale devices 100*a*-100*c* act as self-checkout terminals, and a customer may complete a transaction using the point-of-sale devices 100*a*-100*c* without assistance from an employee. The point-of-sale devices 100*a*-100*c* provide information regarding the transactions to a site controller 200. While FIG. 1 shows three point-of-sale devices 100*a*-100*c*, any practical number of point-of-sale devices 100 may be used according to the application of the user.

The site router 600 enables communication between the point-of-sale devices 100*a*, 100*b*, 100*c*, the site controller 200, and the controller client 500. The site router 600 may be communicatively coupled to the point-of-sale devices 100*a*, 100*b*, 100*c*, the site controller 200, and the controller client 500 via wired or wireless connection, such as Ethernet. In alternative examples, the site controller 200 may be directly connected to the point-of-sale devices 100*a*-100*c* via wired or wireless connection.

Figure 13:
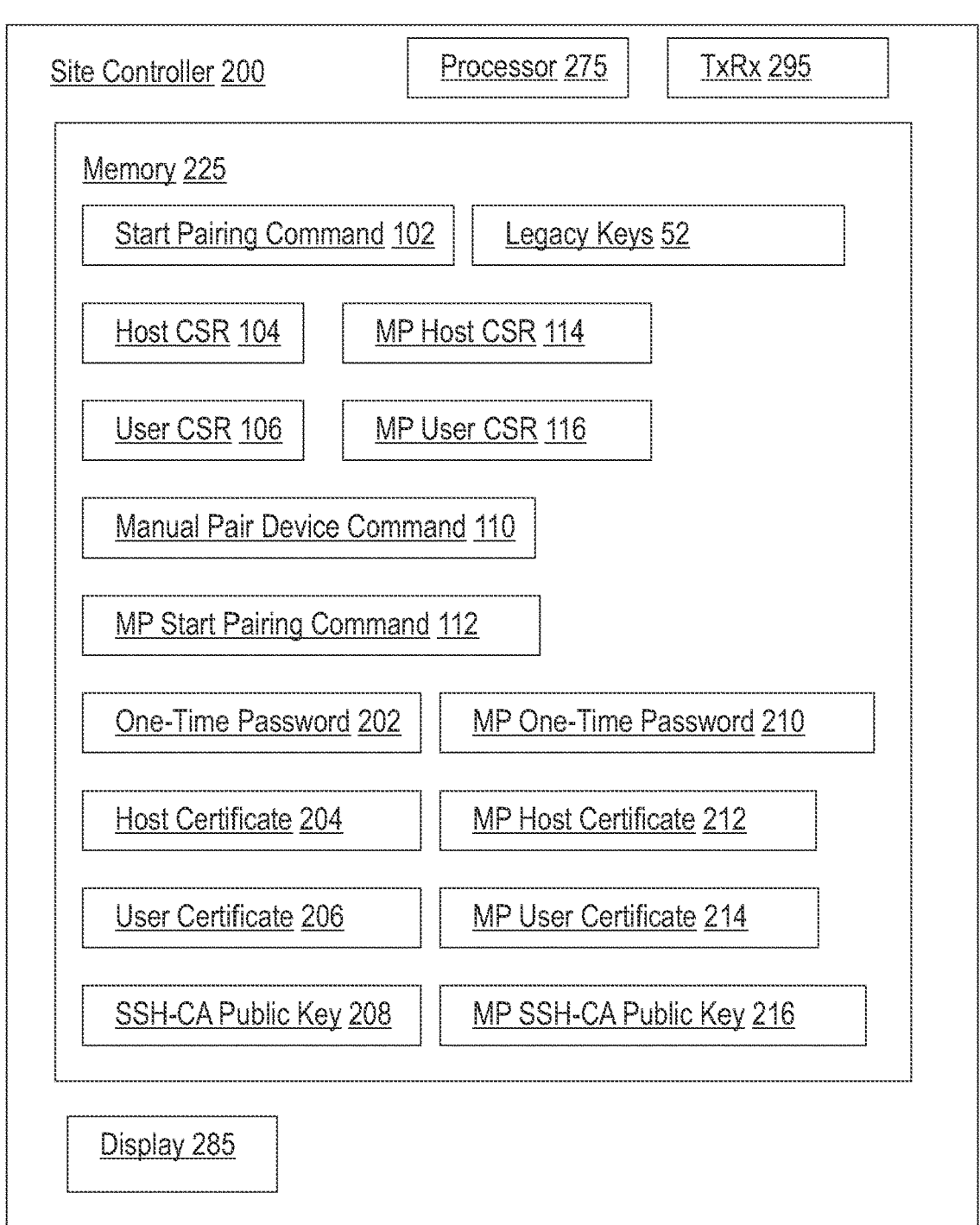
FIG. 13 is a schematic diagram of a site controller, in accordance with an example.

The site controller 200 receives, processes, and stores transaction information provided by the point-of-sale devices 100*a*-100*c*. As shown in FIG. 13, the site controller 200 may include a memory 225, a display 285, a processor 275, and a transceiver 295. Further, the site controller 200 transmits configuration information to the point-of-sale devices 100*a*-100*c*. This configuration information may determine various settings (regarding sales, payment, etc.) of each point-of-sale device 100*a*-100*c*. The site controller 200 may also transmit software upgrades to the point-of-sale devices 100*a*-100*c*. For example, when the site controller 200 undergoes a software upgrade, it may also transmit a corresponding upgrade to each point-of-sale device 100a-100c to ensure the upgrade of the site controller 200 is compatible with the point-of-sale devices 100a-100c.

The controller client 500 is communicatively coupled to the site controller 200, either directly or via site router 600, via wired or wireless connection. The controller client 500 can be used to configure the site controller 200, including facilitating pairing the site controller 200 to one or more of the point-of-sale devices 100a-100c. The controller client 500 may be used to program additional settings of the site controller 200. In some examples, the controller client 500 may be a desktop computer, laptop computer, or a mobile device (such as a smartphone). In one example, the site controller 200 and the controller client 500 may be positioned locally relative to each other, such as in a backroom of a retail shop. In other examples, the site controller 200 may be located remotely relative to the controller client 500.

With further reference to FIG. 1, one of the point-of-sale devices 100a, 100b, 100c such as point-of-sale device 100a, may be paired to the site controller 200 via a manual pairing process. In this process, an authorized user initiates a pairing service controller client 500. In this example, the controller client 500 includes a browser connected to the site controller 200 to facilitate the pairing process. The authorized user may have to enter a password or other credentials to initiate the pairing process.

The user then must initiate the pairing process on the point-of-sale device 100a. This may be done by pressing a "pair device" button. The "pair device" button may be a hard key or soft key arranged on the point-of-sale device 100a. The "pair device" button may also be a virtual button displayed on the interface 165 (such as a graphical user interface) of the point-of-sale device 100a. Pressing the "pair device" button transmits a "start pairing" command 112 (see FIG. 12) to the site controller 200. Other methods of initiating the transmission of the start pairing command 112 for manual pairing may be used.

Upon receiving the start pairing command 112, the site controller 200 generates a one-time password 210 (see FIG. 13) unique to this manual pairing session. The authorized user may read the one-time password 210 either (1) from the browser of the controller client 500 or (2) from a two-digit, seven-segment display 285 (such as a two-digit, seven-segment display) on the site controller 200. The authorized user then returns to the point-of-sale device 100a and enters the one-time password 210 via interface 165. Entering the one-time password 210 triggers the point-of-sale device 100a to transmit two signing requests to the site controller 200; one signing request for the point-of-sale device 100a itself (the "host" request 114 (see FIG. 12)), and one signing request for the specific user logging into the point-of-sale device 100a (the "user" request 116 (see FIG. 12). In some examples, this user may be different from the authorized user who initiated the pairing processes via the controller client 500.

In an alternate example, the one-time password 210 may be read off the display 285 of the site controller 200 by a camera attached to the point-of-sale device 100a, thus ensuring physical proximity between the site controller 200 and the point-of-sale device 100a. In a further example, the one-time password 210 could be transmitted through the air, rather than displayed, by means such as vibrations or magnetic impulses, to the point-of-sale device 100a.

Upon receiving the signing requests, the site controller 200 generates a signed host certificate 212 (see FIG. 13) and a signed user certificate 214 (see FIG. 13), and transmits the certificates 212, 214 to the point-of-sale device 100a. The point-of-sale device 100a receives the certificates 212, 214, reboots, and is then able to securely communicate with the site controller 200.

With continued reference to FIG. 1, an auto-pairing process may also be performed to enable communication between the point-of-sale device 100a and the site controller 200. In a typical example, and as described above, the auto-pairing process is performed as part of an overall software upgrade applied to the point-of-sale device 100a and the site controller 200. In this way, the point-of-sale device 100a and the site controller 200 may communicate initially without performing the more onerous manual pairing. This allows for a retail shop to process payments and transactions immediately following the software upgrade, even if the employees lack the technical skills or credentials to perform the manual pairing process. For increased security, the point-of-sale device 100a will provide recurring reminders to perform a manual pairing process at some point in the near future.

The auto-pairing process begins with the internal application programming interface (API) of the client controller 500 activating the pairing service as part of the software upgrade of the site controller 200. Similarly, the software upgrade uses the API of the point-of-sale device 100a to initiate the pairing process. As with the manual pairing process, the point-of-sale device 100a transmits a "start pairing" command 102 (see FIG. 12) to the site controller 200. This triggers the site controller 200 to generate a one-time password 202 (see FIG. 13) unique to this pairing session.

Figure 4:
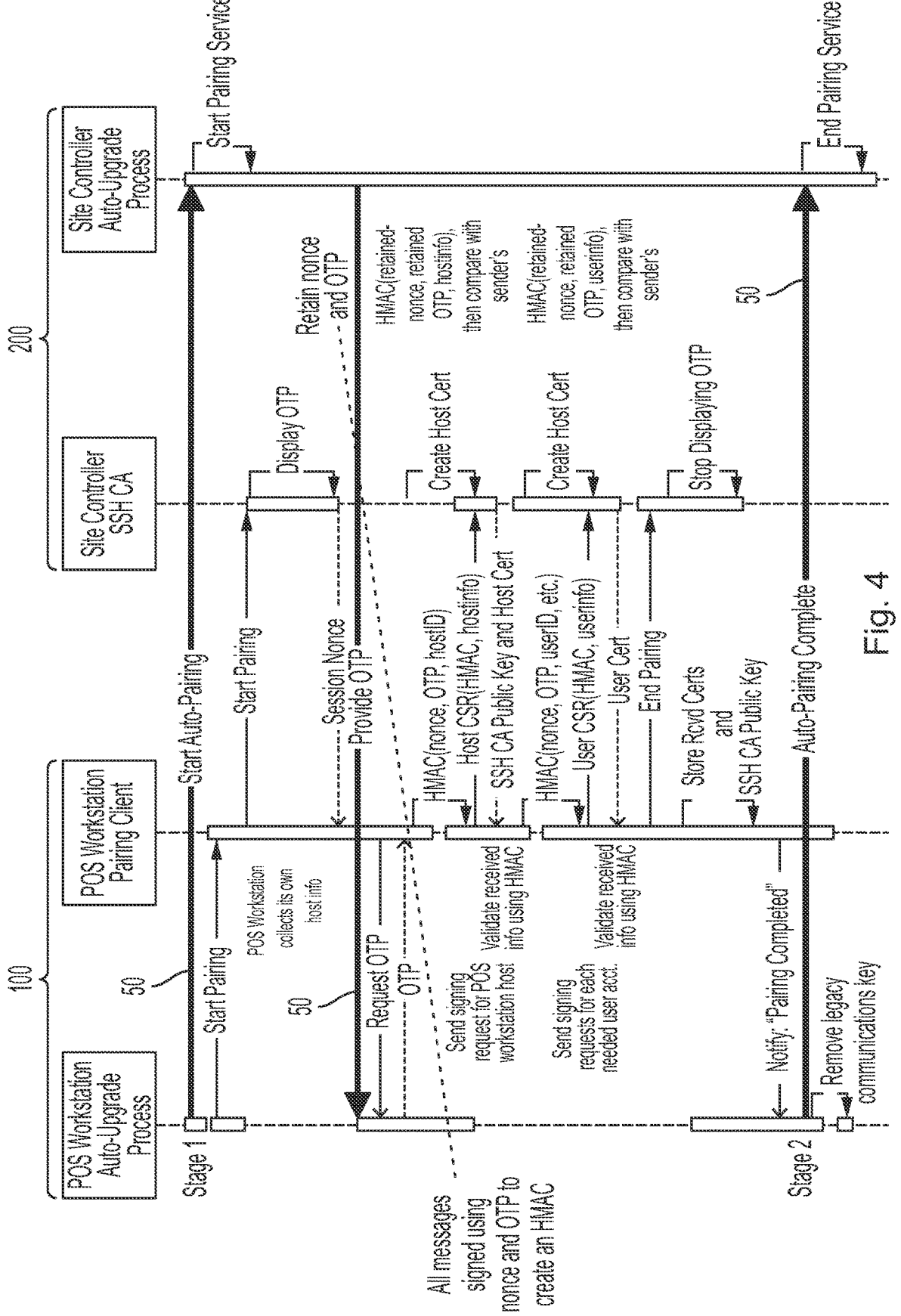
FIG. 4 is a sequence diagram of an automatic pairing process, in accordance with an example.

The auto-upgrade process then transmits the one-time password 202 to the point-of-sale device 100a via an existing legacy communications channel 50 (see FIG. 4). Depending on the system architecture and configuration, the one-time password 210 may be transmitted by either the site controller 200 or the controller client 500. The point-of-sale device 100a receives the one-time password 202, and enters the one-time password 202 via API call. Entering the one-time password 202 triggers the point-of-sale device 100a to transmit host and user signing requests 104, 106 (see FIG. 12) to the site controller 200. The site controller 200 receives the requests and generates signed host and user certificates 204, 206 (see FIG. 13) to the point-of-sale device 100a. The point-of-sale device 100a then ends the pairing process, completes the upgrade software process, and reboots into normal point-of-sale operation.

Thus, the auto-upgrade removes human intervention from the pairing process by automatically (1) activating the pairing service, (2) initiating the pairing of the point-of-sale device 100a and the site controller 200, (3) transmitting the one-time password 202 to the point-of-sale device 100a via the existing legacy communication channel 50, and (4) automatically entering the one-time password 202 into the point-of-sale device 100a. While this auto-upgrade process is significantly easier for users to implement, and is more secure than distributing sensitive assets (like private keys) with the software upgrade bundle, it is less secure than requiring on-site employees to manually read a one-time password 210 from the site controller 200 or the controller client 500, and then manually enter the one-time password 210 into the point-of-sale device 100a. Therefore, for increased security, reminders 108 (see FIG. 12) will be provided to the user of the auto-paired point-of-sale device 100a to perform manual pairing.

Figure 2:
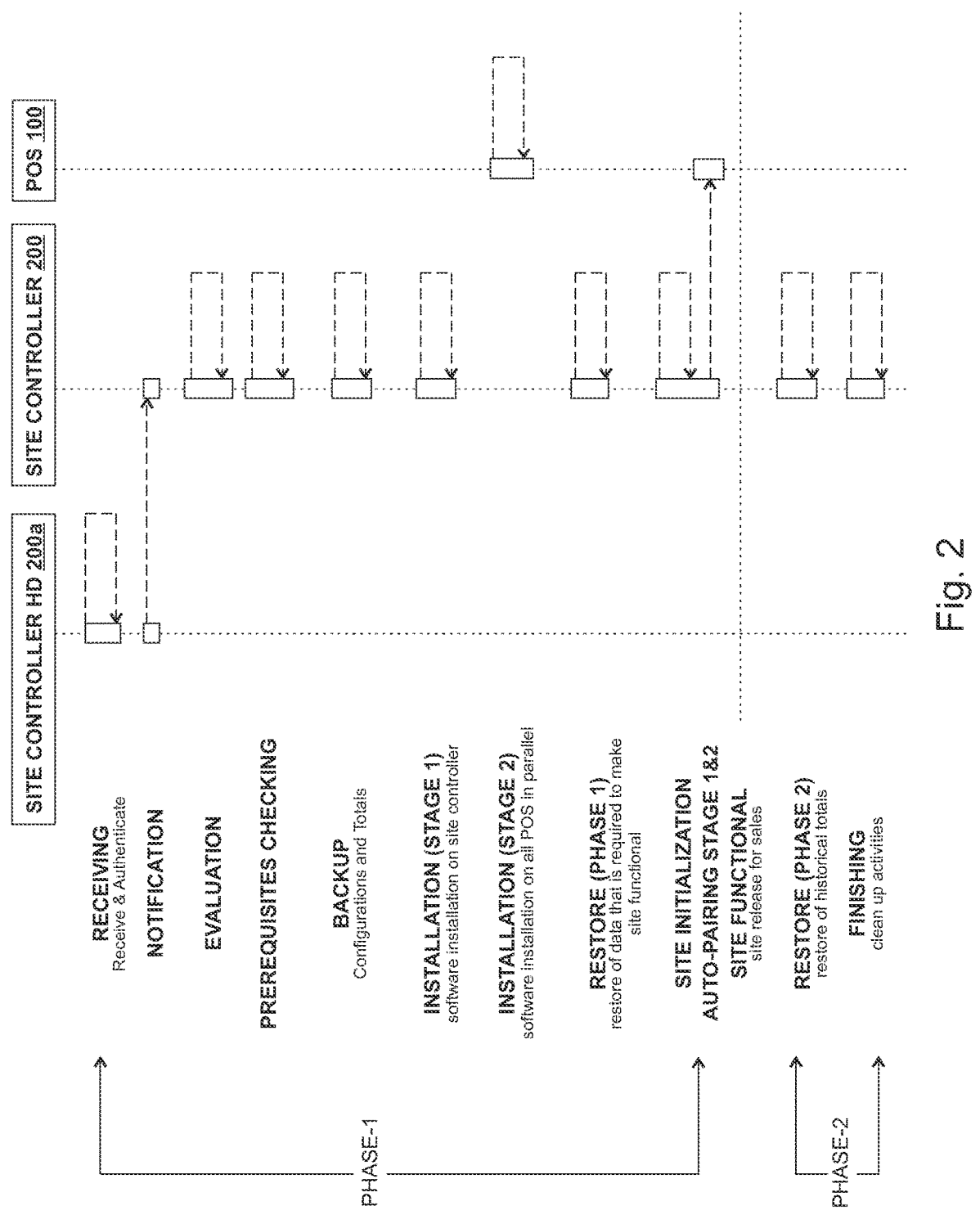
FIG. 2 is a sequence diagram of a system-wide software upgrade process, in accordance with an example.

FIG. 2 illustrates the timing of the auto-pairing process in relation to the various steps of the software upgrade process.

As shown, the first phase on the software upgrade includes a site controller hard drive 200a receiving and authenticating the upgrade. The site controller 200 is then notified of the received software upgrade. The site controller 200 then performs an evaluation, checks prerequisites for the software upgrade, and backs up configurations and payment/transaction totals. The software is then installed on both the site controller 200 as well as the connected point-of-sale devices 100. The site controller 200 then restores any data required to make the site functional. The site controller 200 and point-of-sale devices 100 are initialized, and the auto-pairing of the site controller 200 and the point-of-sale devices 100 occurs. Conducting the auto-pairing makes the overall site functional to conduct sales. Following the auto-pairing, historical data is restored to the site controller 200, and clean-up activities complete the software upgrade process.

Figure 3:
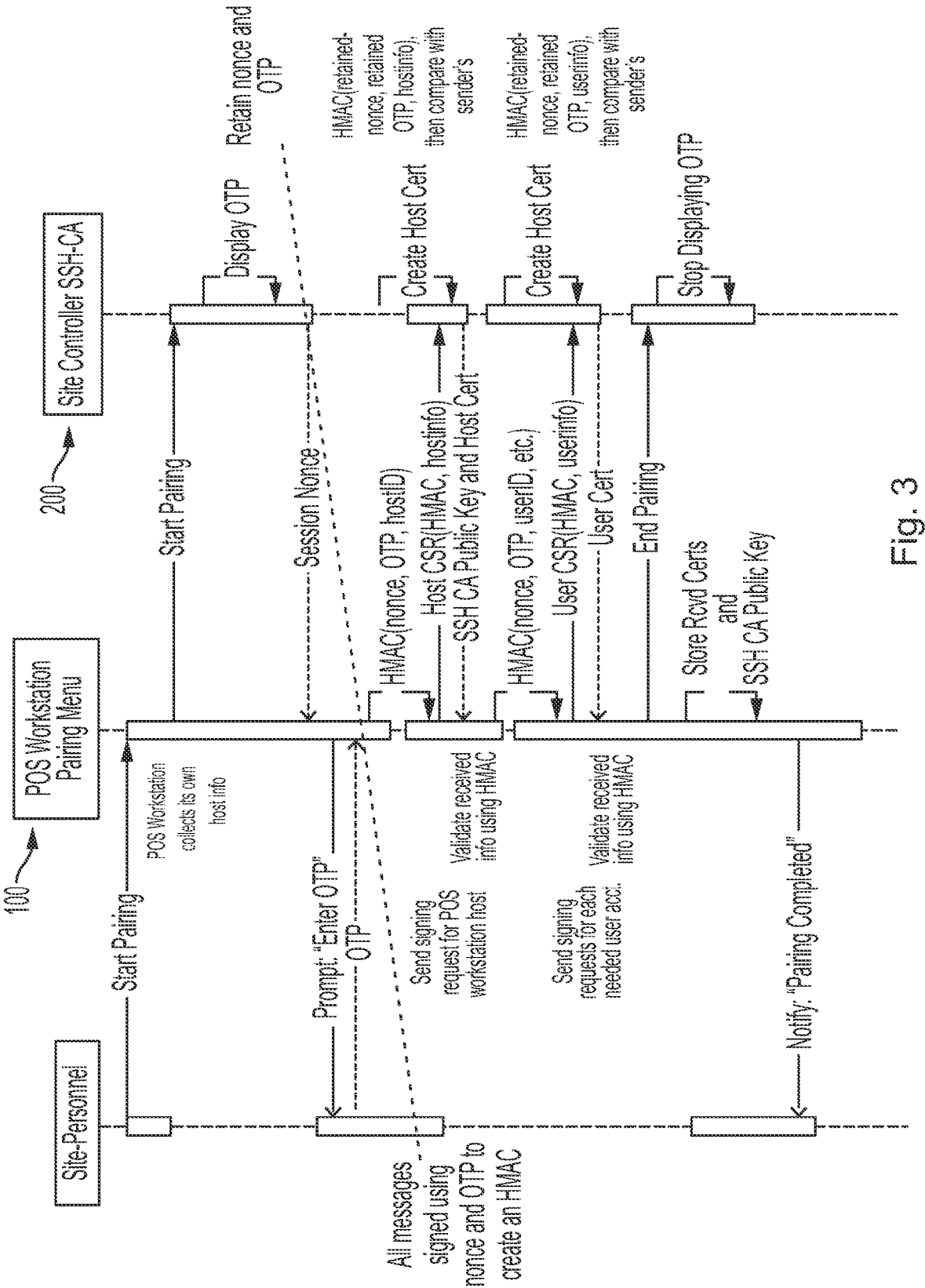
FIG. 3 is a sequence diagram of a manual pairing process, in accordance with an example.

FIG. 3 shows a sequence diagram of the aforementioned manual pairing process. The manual pairing process utilizes the secure shell (SSH) protocol, specifically secure shell certificate authentication (SSH-CA). While FIG. 3 depicts the manual pairing of a single point-of-sale device 100 to a site controller 200, any number of point-of-sale devices 100 may be paired to the site controller 200 (or some other device) via manual pairing. Further, other types of devices (such as audio-visual gear) may be paired to the site controller 200 according to the depicted manual pairing process.

As shown in the non-limiting example of FIG. 3, the manual pairing process is initiated by site personnel manually entering a manual pair device command 110 (see FIG. 12) into the interface 165 (see FIG. 12) of point-of-sale device 100. The "start pairing" command 112 (see FIG. 12) is passed to the site controller 200. The site controller 200 generates and displays a one-time password 210 via display 285. The one-time password 210 may be displayed on either the site controller 200 itself, and/or on a browser of a controller client 500 for the site-personnel to read. The site controller 200 also generates a nonce to be used for the presently occurring pairing session. The session nonce is then passed to the point-of-sale device 100. The site controller 200 stores the one-time password 210 and nonce from this manual pairing process in memory 225 (see FIG. 13) to use in subsequent processing steps.

The point-of-sale device 100 prompts the site-personnel to enter the one-time password 210. Once the one-time password 210 is received, the point-of-sale device 100 issues at least two certificate signing requests (CSRs) to the site controller 200. First, the point-of-sale device 100 issues a CSR related to the specific point-of-sale device 100 being paired, referred to as a host CSR 114 (see FIG. 12). The host CSR 114 includes a host hash-based message authentication code (HMAC) and hostinfo. The point-of-sale device 100 generates the message HMAC based on the session nonce, the one-time password 210, and the hostID. Upon receiving the host CSR 114, the site controller 200 generates a host certificate 212 (see FIG. 13), and transmits the certificate 212 and a secure shell certificate authentication (SSH-CA) public key 216 (see FIG. 13) to the point-of-sale device 100. The point-of-sale device 100 then validates the received message using the message HMAC.

Second, the point-of-sale device 100 also issues a CSR related to the individual user logged-in to the point-of-sale device 100, referred to as a user CSR 116 (see FIG. 12). The user CSR 116 includes a message HMAC and userinfo. The point-of-sale device 100 generates the message HMAC based on the session nonce, the one-time password 210, and the userID. The message HMAC may be based on additional information where relevant. Upon receiving the user CSR 106, the site controller 200 generates a user certificate 214 (see FIG. 13), and transmits the certificate 214 to the point-of-sale device 100. The point-of-sale device 100 then validates the received message using the message HMAC. Additional user CSRs 116 may be issued for other individuals using the point-of-sale device 100.

The validation of the messages is based on standard HMAC architecture. Notably, the nonce (or the "seed" of the HMAC) is shared between the site controller 200 and the point-of-sale device 100 over their wired or wireless connection. However, the one-time password 210 (or the "passphrase" of the HMAC) is conveyed by a person reading the password 210 off the site controller 200. The nonce and the passphrase combine to form the "key" of the HMAC algorithm. Thus, validation of the received certificates requires both the point-of-sale device 100 and the site controller 200 to know the same nonce and one-time password 210. In some examples, the nonce is at least 128 bits, while the one-time password 210 is at least six hexadecimal digits.

Having received the certificates 212, 214 and the SSH-CA public key 216, the point-of-sale device 100 has all of the information needed to facilitate communication with the site controller 200. Accordingly, the point-of-sale device 10 transmits an "end pairing" command to the site controller 200, which triggers the site controller 200 to stop displaying the one-time password 210. The point-of-sale device 100 stores the received certificates 212, 214 and the SSH-CA public key 216 in memory 125 (see FIG. 12), and issues a notification to the site personnel that the manual pairing process has completed.

FIG. 4 shows a sequence diagram of the aforementioned automatic pairing process. As with the manual pairing process, the automatic pairing process utilizes the SSH-CA protocol. As previously mentioned, the automatic pairing process occurs during the software upgrade, typically after the installation of the upgraded software, but before the historic data has been restored to the site controller 200 and the point-of-sale devices 100. The automatic pairing process leverages existing legacy communication channels 50 between the point-of-sale device 10 and the site controller 200 to automate the manually performed aspects of manual pairing. The legacy communication channels 50 may utilize any practical protocol. In one example, the legacy communication channel 50 is an SSH channel based on public-private key pairs provided with a previously installed software bundle. The automatic pairing process is more secure than the legacy communication channel 50, as the automatic pairing process generates certificates 204, 206 (see FIG. 13) based on a one-time password 202 (see FIG. 13). In FIG. 4, the legacy communication channel 50 is indicated by bolded line.

While FIG. 4 depicts the automatic pairing of a single point-of-sale device 100 to a site controller 200, any number of point-of-sale devices 100 may be paired to the site controller 200 (or some other device) via automatic pairing. Further, other types of devices (such as audio-visual gear) may be paired to the site controller 200 according to the depicted manual pairing process as long as a legacy communication channel 50 exists between the device and the site controller 200.

As shown in the non-limiting example of FIG. 4, the point-of-sale device 100 initiates the automatic pairing process by transmitting a start auto-pairing command to the site controller 200 via the legacy communication channel 50. The site controller 200 then starts the pairing service.

The point-of-sale device 100 then generates a "start pairing" command 102 (see FIG. 12), and transmits the command to the site controller 200. The site controller 200 generates and displays a one-time password 202 (see FIG. 13) in response to receiving the "start pairing" command 102. Rather than relying on site-personnel to read the one-time password 202 off of the seven-segment display 285 (see FIG. 13) of the site controller 200 or the controller client 500 (see FIG. 1), the site controller 200 transmits the one-time password 200 to the point-of-sale device 100 via the legacy communications channel 50. Accordingly, in some examples of the automatic pairing process, the site controller 200 does not display the one-time password 202. The point-of-sale device 100 also receives a nonce generated by the site controller 200. The site controller 200 stores the one-time password 202 and nonce to use in subsequent processing steps.

Having received the one-time password 202 and the nonce, the point-of-sale device 100 issues at least two CSRs to the site controller 200. First, the point-of-sale device 100 issues a host CSR 104 (see FIG. 12). The host CSR 104 includes a message HMAC and hostinfo. The point-of-sale device 100 generates the message HMAC based on the session nonce, the one-time password 202, and the hostID. Upon receiving the host CSR 104, the site controller 200 generates a host certificate 204 (see FIG. 13), and transmits the certificate 204 and an SSH-CA public key 208 (see FIG. 13) to the point-of-sale device 100. The point-of-sale device 100 then validates the received message using the message HMAC.

Second, the point-of-sale device 100 also issues a user CSR 106 (see FIG. 12). The user CSR 106 includes a message HMAC and userinfo. The point-of-sale device 100 generates the message HMAC based on the session nonce, the one-time password 202, and the userID. The message HMAC may be based on additional information where relevant. Upon receiving the user CSR 106, the site controller 200 generates a user certificate 206, and transmits the certificate to the point-of-sale device 100. The point-of-sale device 100 then validates the received message using the message HMAC.

Having received the certificates 204, 206 and the SSH-CA public key 208, the point-of-sale device 100 transmits an "end pairing" command to the site controller 200, which triggers the site controller 200 to stop displaying the one-time password 202 (if the one-time password 202 was displayed earlier in the sequence). The point-of-sale device 100 stores the received certificates 204, 206 and the SSH-CA public key 208 in memory 125 (see FIG. 12), and issues a notification to the site personnel that the manual pairing process has completed. The point-of-sale device 100 then notifies the site controller 200 that auto-pairing has completed, resulting in the site controller 200 ending pairing service. Importantly, the point-of-sale device 100 also removes any keys related to the legacy communications channel 50, thereby requiring the point-of-sale device 100 to communicate with the site controller 200 via the more secure auto-paired channel. Following successful auto-pairing, the interface 165 of the point-of-sale device 100 will display reminder messages to encourage the site personnel to manually pair the point-of-sale device 100 to the site controller 200.

Figure 5:
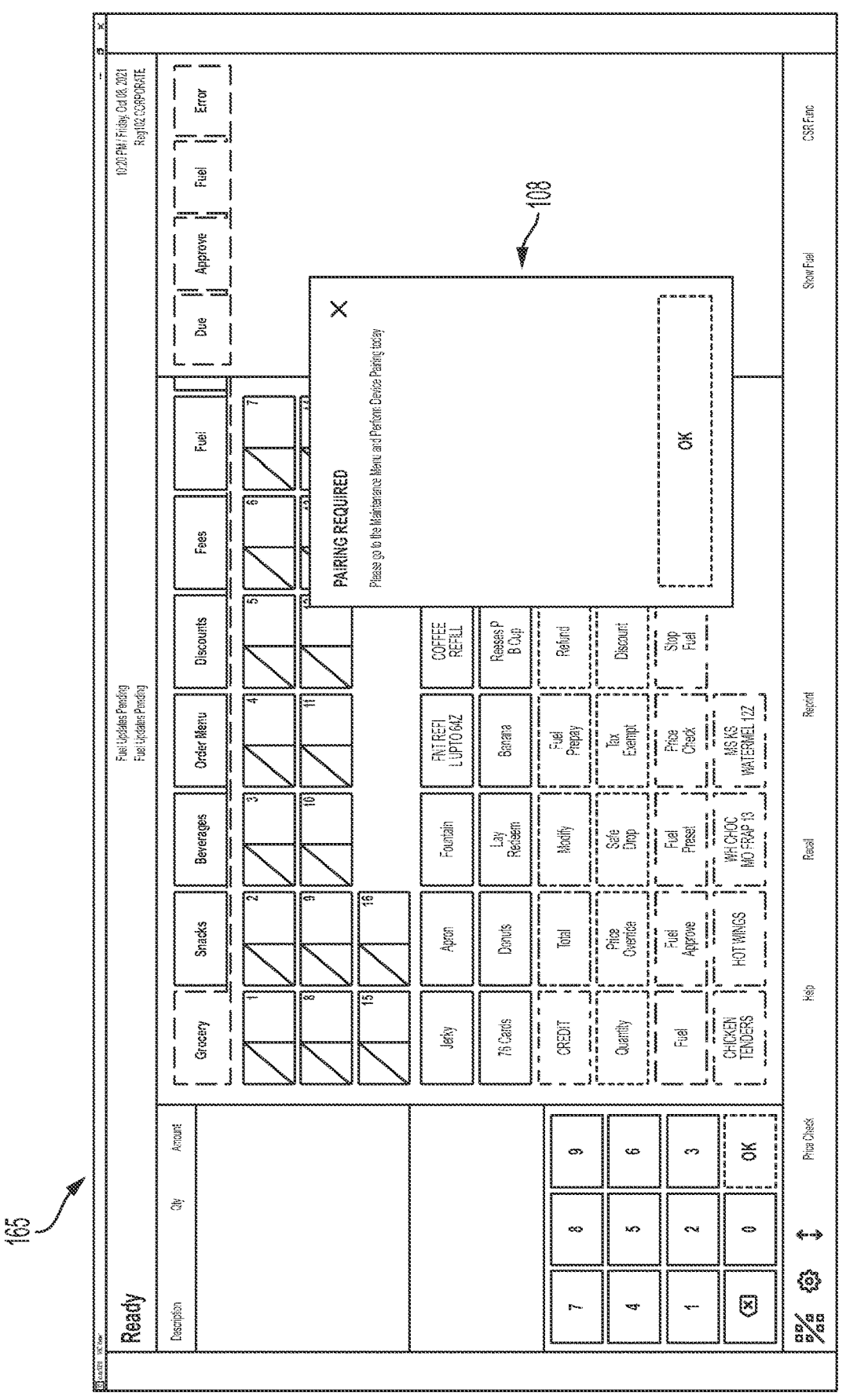
FIG. 5 is a screenshot of a point-of-sale interface showing a manual pairing reminder pop-up window, in accordance with an example.

FIG. 5 shows an example screenshot of an interface 165 of a point-of-sale device 100 (see FIG. 1) in use after the software upgrade has been installed. As previously stated, the "auto-pairing" immediately following the software installation allows the point-of-sale device 100 to remain in communication with the site controller 200 (see FIG. 1). As such, a cashier may use the point-of-sale device 100 to process customer transactions before manual pairing is performed. However, as manual pairing provides a greater degree of security than "auto-pairing," the cashier will be reminded to perform manual pairing through a recurring manual pairing required pop-up window 108. As shown in FIG. 5, the manual pairing required pop-up window 108 overlays the point-of-sale interface 165, requiring the cashier to acknowledge the pop-up window 108 by clicking "OK" to continue using the point-of-sale device 100. This pop-up window 108 may be configured to appear periodically, such as every 5 minutes. Alternatively, the pop-up window 108 may be configured to appear in response to certain actions performed with the point-of-sale device 100 (such as after a completed transaction) until a trusted relationship is established by manually pairing the point-of-sale device 100 and the site controller 200. The point-of-sale device 100 may determine the status of the trusted relationship by evaluating a variable, flag, or token provided or set when the trusted relationship is formed. This manual pairing reminder window 108 is meant to remind the cashier to either perform manual pairing themselves, or find a skilled and credentialed employee to perform the pairing. Once the manual pairing is performed, the interface 165 will no longer show the manual pairing reminder pop-up window 108.

Figure 6:
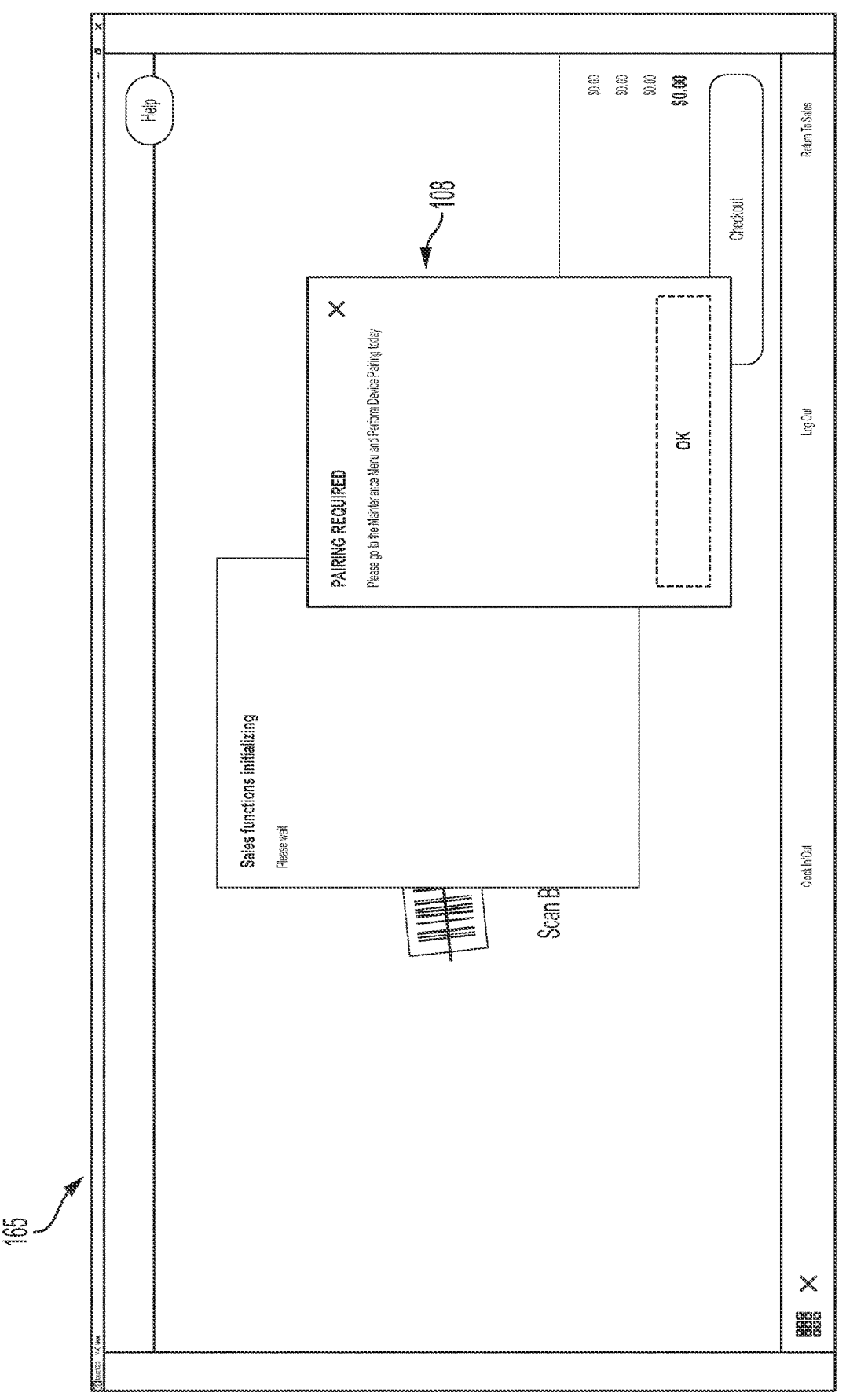
FIG. 6 is a screenshot of a point-of-sale interface showing a manual pairing reminder pop-up window, in accordance with a further example.

FIG. 6 shows a variation of FIG. 5, wherein the manual pairing reminder pop-up window 108 is displayed when the point-of-sale device 100 is in self-checkout mode. In self-checkout mode, the point-of-sale device 100 functions as a self-checkout terminal, allowing customers to complete their purchase unaided by a cashier. Displaying the manual pairing reminder pop-up window 108 may cause a customer to call for help, leading an employee to perform manual pairing.

Figure 7:
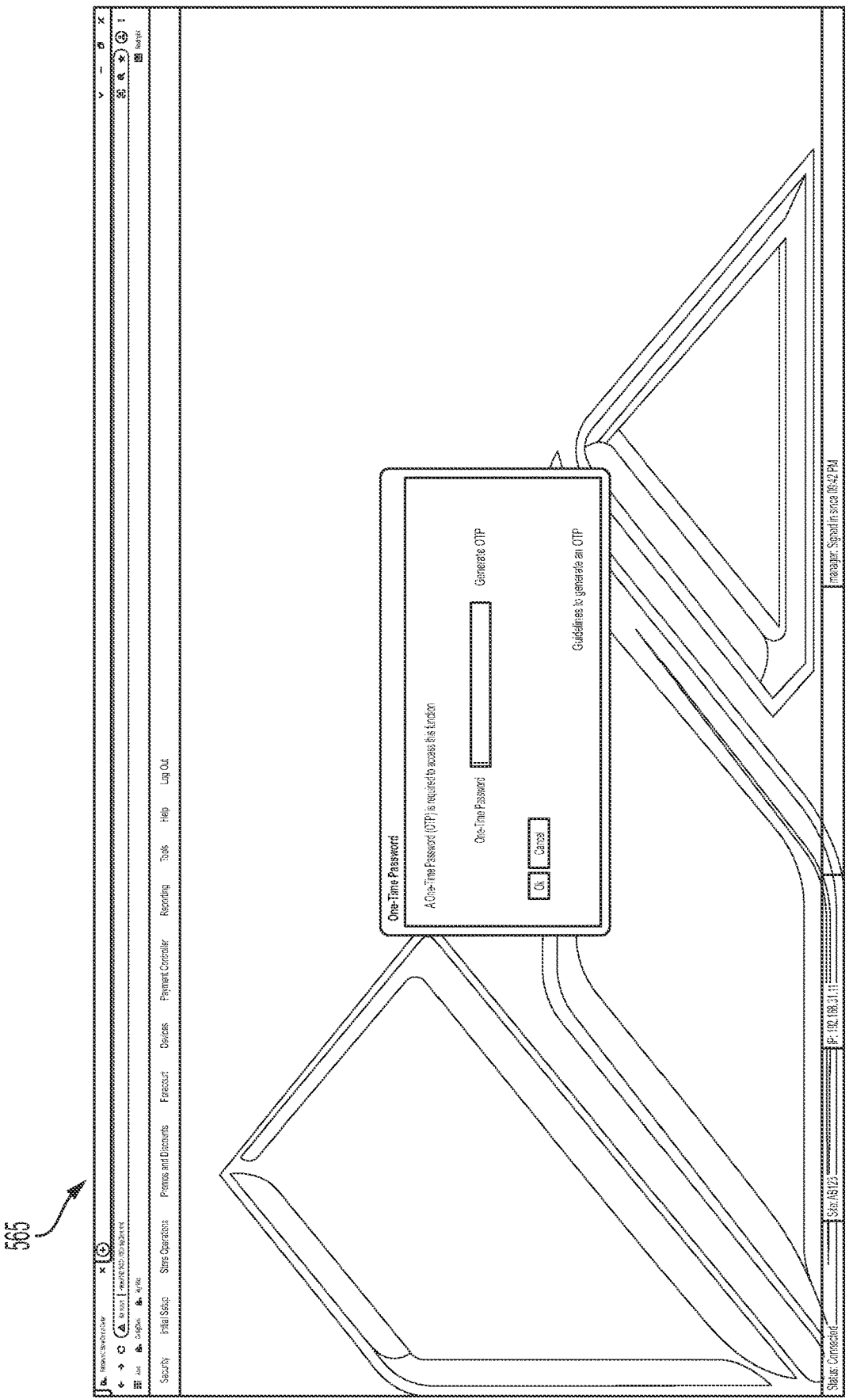
FIG. 7 is a screenshot of a controller client interface showing a One-Time Password pop-up window, in accordance with a further example.
Figure 8:
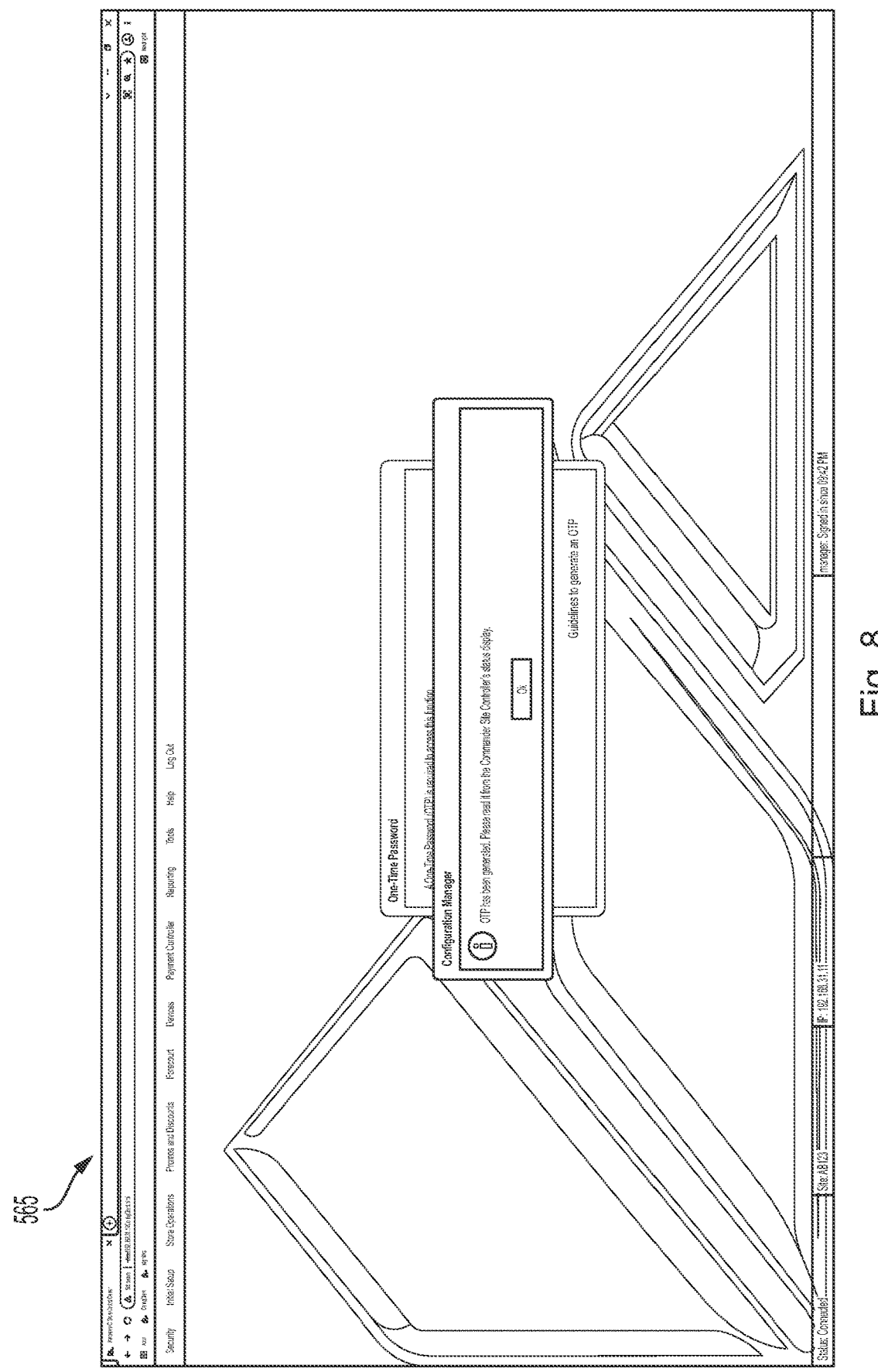
FIG. 8 is a screenshot of a controller client interface showing a One-Time Password confirmation pop-up window, in accordance with a further example.

FIG. 7 shows a configuration screen 565 of a controller client 500 (see FIG. 1) communicatively coupled to a site controller 200 (see FIG. 1). When an employee decides to manually pair a point-of-sale device 100 (see FIG. 1) with the site controller 200, they are required to enter a new one-time password 210 (see FIG. 12) into the point-of-sale device 100. This new one-time password 210 is generated by the site controller 200. In one example, for security purposes, the one-time password 210 may be found by viewing a status display 285 (such as a two-digit, seven segment display) (see FIG. 13) physically located on the site controller 200. The display of the one-time password 210 may be triggered by a user clicking the "Generate OTP" wording shown on a pop-up window in the configuration screen 565. FIG. 8 shows a pop-up message instructing a user to view the status display 285 of the site controller 200 to retrieve the one-time password 210. By restricting access to the one-time password 210 to individuals within physical proximity of the site controller 200, the threat of remote cyber-attacks is eliminated. Further, this one-time password 210 may also be required to be entered into the controller client 500 to allow an employee to initiate the pairing service of the site controller 200.

Figure 9:
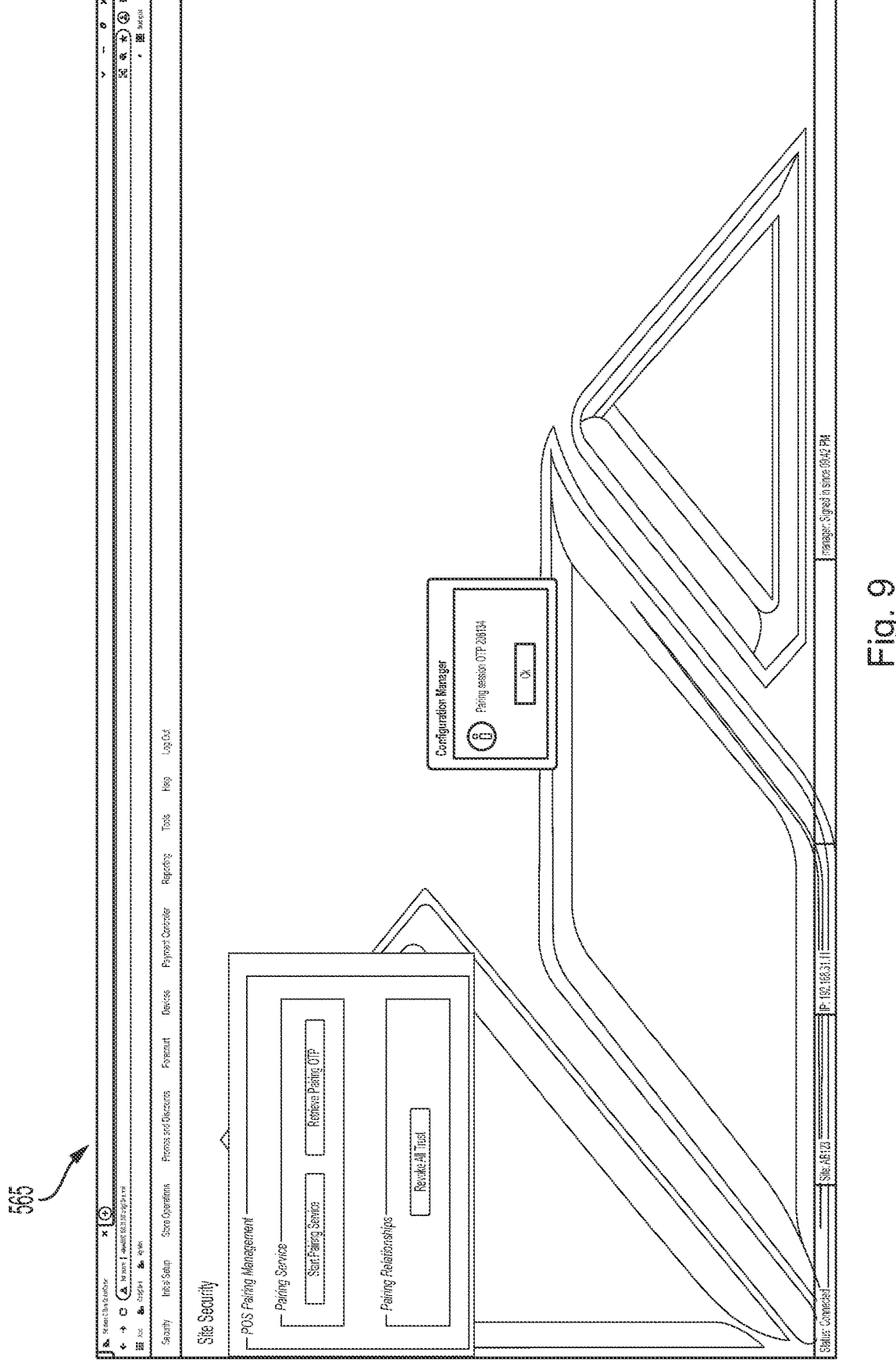
FIG. 9 is a screenshot of a controller client interface showing a One-Time Password code retrieval pop-up window, in accordance with a further example.
Figure 10:
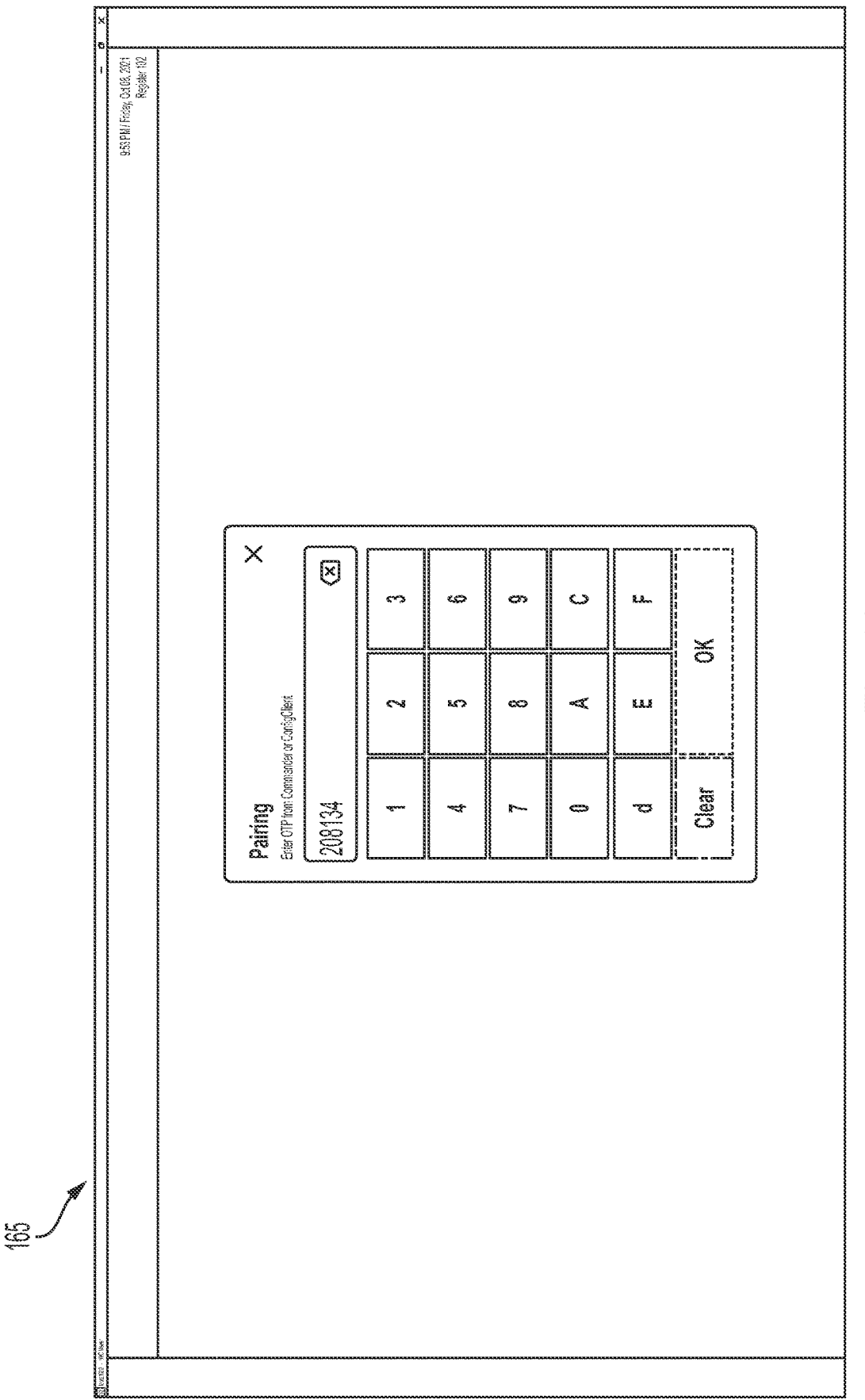
FIG. 10 is a screenshot of a point-of-sale interface showing a One-Time Password pairing code pop-up window, in accordance with a further example.
Figure 11:
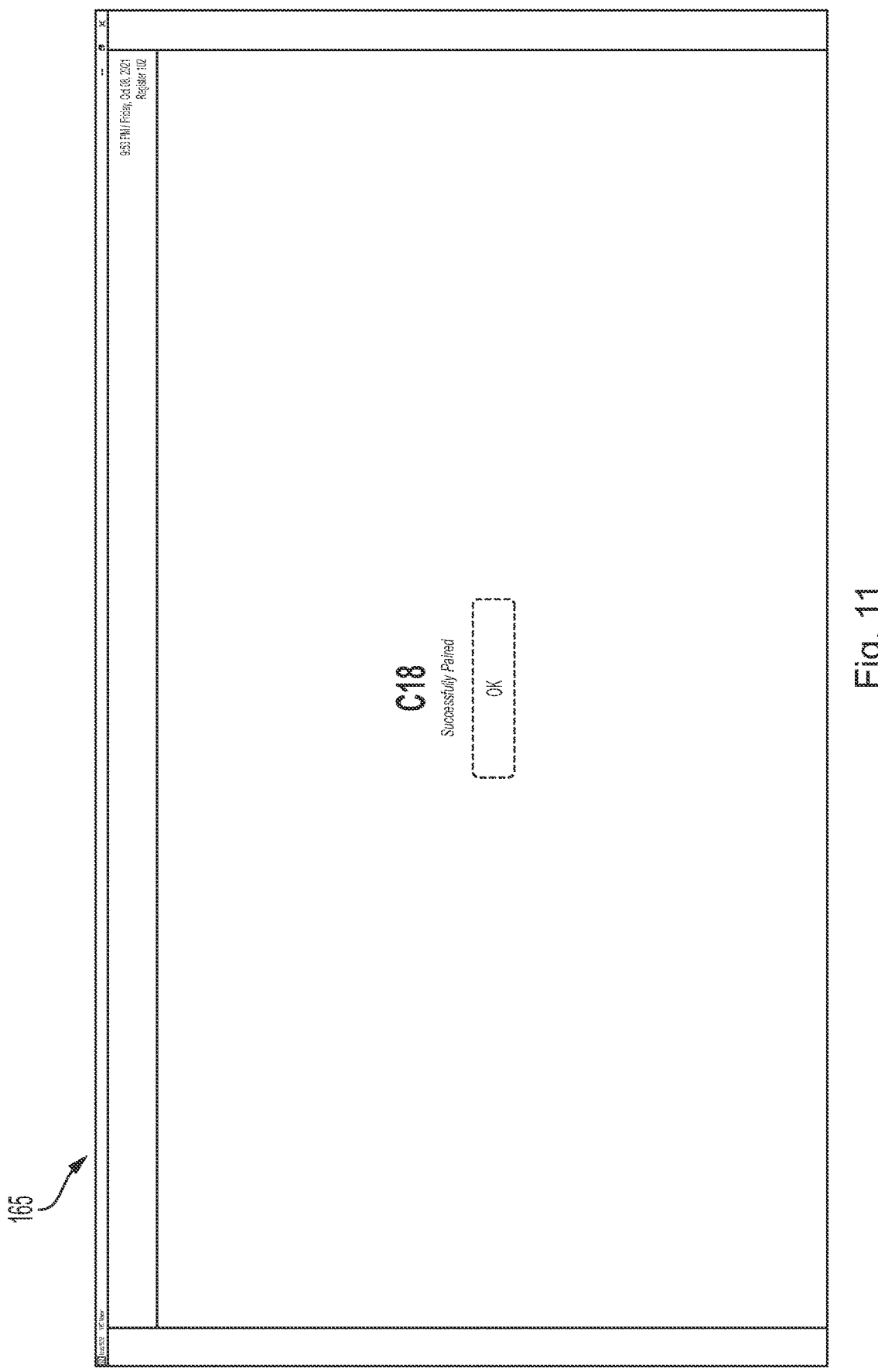
FIG. 11 is a screenshot of a point-of-sale interface showing a pairing confirmation screen, in accordance with a further example.

Once the one-time password 210 has been entered, the user initiates the pairing service on both the site controller 200 and the point-of-sale device 100. As shown in FIG. 9, the user can retrieve the one-time password from the interface 565 of the controller client 500. In this case, the one-time password is 208134. While the one-time password 210 of this example includes six hexadecimal digits, additional digits may be included to increase security. As shown in FIG. 10, the user may then enter the one-time password 210 into a pairing code entry pop-up window of the interface 165 of the point-of-sale device 100. As the same one-time password 210 was generated by the site controller 200, the manual pairing process has been completed, and a secure, trusted relationship now exists between the point-of-sale device 100 and the site controller 200. The formation of the trusted relationship results in the display of the successful pairing screen on the interface 165 of the point-of-sale device 100 as shown in FIG. 11. Accordingly, the point-of-sale device 100 will no longer display the manual pairing reminder pop-up window 108 shown in FIGS. 5 and 6.

FIG. 12 is a schematic illustration of a point-of-sale device 100. Generally, the point-of-sale device 100 includes a memory 125, an interface 165, a processor 175, and a transceiver 195. The memory 125 stores a wide array of data received and/or generated by the point-of-sale device 100 as part of the auto-pairing and manual pairing processes. Prior to the pairing processes, the memory 125 stores one or more legacy keys 52 corresponding to a legacy communications channel 50 (see FIG. 4). As part of the auto-pairing process, the memory 125 stores data received via the transceiver 195, including a one-time password 202, a host certificate 204, a user certificate 206, and an SSH-CA public key 208. The memory 125 also stores data generated by the processor 175 to be transmitted via the transceiver 195, including a start pairing command 102, a host CSR 104, and a user CSR 106. As part of the manual pairing process completed after auto-pairing, the memory 125 stores data received via the transceiver 195, including a manual pairing ("MP") one-time password 210, an MP host certificate 212, an MP user certificate 214, and an MP SSH-CA public key 216. The memory 125 also stores data generated by the processor 175 to be transmitted via the transceiver 195, including an MP start pairing command 112, an MP host CSR 114, and an MP user CSR 116. The memory 125 also stores a manual pair device command 110 received via the interface 165 to trigger the manual pairing process. Following auto-pairing, the interface 165 also displays a manual pairing reminder pop-up window 108 until manual pairing has been completed.

FIG. 13 is a schematic illustration of a site controller 200. Generally, the point-of-sale device 100 includes a memory 225, a processor 275, a display 285, and a transceiver 295. The memory 225 stores a wide array of data received and/or generated by the site controller 200 as part of the auto-pairing and manual pairing processes. Prior to the pairing processes, the memory 225 stores one or more legacy keys 52 corresponding to a legacy communications channel 50 (see FIG. 4). As part of the auto-pairing process, the memory 225 stores data received via the transceiver 295, including a start pairing command 102, a host CSR 104, and a user CSR 106. The memory 225 also stores data generated by the processor 275 to be transmitted via the transceiver 295, including a one-time password 202, a host certificate 204, a user certificate 206, and an SSH-CA public key 208. As part of the manual pairing process completed after auto-pairing, the memory 225 stores data received via the transceiver 195, including a manual pair device command 110, a manual pairing ("MP") start pairing command 112, an MP host CSR 114, and an MP user CSR 116. The memory 225 also stores data generated by the processor 275 to be transmitted via the transceiver 195, including an MP one-time password 210, an MP host certificate 212, an MP user certificate 214, and an MP SSH-CA public key 216. The display 285 may be a seven-segment display showing the one-time password 202 of the MP one-time password 210 generated by the processor 275.

FIGS. 14 and 15 show a flowchart of a method 900 for pairing a point-of-sale device to a site controller. The method 900 includes transmitting 902, from the point-of-sale device to the site controller, via a legacy communication channel, a start pairing command. The method 900 further includes generating 904, via the site controller, a one-time password upon receiving the start pairing command. The method 900 further includes transmitting 906, via the legacy communication channel, the one-time password from the site controller to the point-of-sale device. The method 900 further includes transmitting 908, from the point-of-sale device to the site controller, a host CSR. The method 900 further includes transmitting 910, from the site controller to the point-of-sale device, a host certificate, and an SSH-CA public key. The host certificate is based on the host CSR. The method 900 further includes transmitting 912, from the point-of-sale device to the site controller, a user CSR. The method 900 further includes transmitting 914, from the site controller to the point-of-sale device, a user certificate based on the user CSR. The method 900 further includes storing 916, via a memory of the point-of-sale device, the host certificate, the user certificate, and the SSH-CA public key. The method 900 further includes removing 918 one or more keys corresponding to the legacy communication channel from the memory of the point-of-sale device. According to an example, the host CSR and the user CSR are based on the one-time password.

According to an example, the method 900 further includes displaying 920, via an interface of the point-of-sale device, a manual pairing reminder window after the host certificate, the user certificate, and the SSH-CA public key have been stored in the memory of the point-of-sale device.

According to an example, the method 900 further includes receiving 922, via an interface of the point-of-sale device, a manual pair device command. The method 900 further includes transmitting 924, from the point-of-sale device to the site controller, a second start pairing command upon receiving the manual pair device command. The method 900 further includes generating 926, via the site controller, a second one-time password upon receiving the second start pairing command. The method 900 further includes displaying 928, via the site controller, the second one-time password. The method 900 further includes receiving 930, via the interface of the point-of-sale device, the second one-time password. The method 900 further includes transmitting 932, from the point-of-sale device to the site controller, a second host CSR. The method 900 further includes transmitting 934, from the site controller to the point-of-sale device, a second host certificate and a second SSH-CA public key, wherein the second host certificate is based on the second host CSR. The method 900 further includes transmitting 936, from the point-of-sale device to the site controller, a second user CSR. The method 900 further includes transmitting 938, from the site controller to the point-of-sale device, a second user certificate based on the user CSR. The method 900 further includes storing 940, via the memory of the point-of-sale device, the second host certificate, the second user certificate, and the second SSH-CA public key. According to an example, the second host CSR and the second user CSR are based on the one-time password.

According to an example, the method 900 further includes disabling 942 the manual pairing reminder window after the second host certificate, the second user certificate, and the second SSH-CA public key have been stored in the memory of the point-of-sale device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A point-of-sale device comprising a memory storing one or more keys corresponding to a legacy communications channel, a processor, and a transceiver, the point-of-sale device configured to:

transmit, via the transceiver over the legacy communication channel, a start pairing command to a site controller;

receive, via the transceiver over the legacy communication channel, a one-time password generated by the site controller;

generate, via the processor, a host certificate signing request (CSR) and a user CSR;

transmit, via the transceiver, the host CSR and the user CSR to the site controller;

receive, via the transceiver, a host certificate corresponding to the host CSR, a user certificate corresponding to the user CSR, and a secure shell certificate authentication (SSH-CA) public key;

store the host certificate, the user certificate, and the SSH-CA public key in the memory; and remove the one or more keys corresponding to the legacy communication channel from the memory.

2. The point-of-sale device of claim 1, wherein the host CSR is based on the one-time password.

3. The point-of-sale device of claim 1, wherein the user CSR is based on the one-time password.

4. The point-of-sale device of claim 1 further comprising an interface configured to display a manual pairing reminder window after the host certificate, the user certificate, and the SSH-CA public key have been stored in the memory.

5. The point-of-sale device of claim 4, wherein the point-of-sale device is further configured to:

receive, via the interface, a manual pair device command;

transmit, via the transceiver, a second start pairing command to the site controller upon receiving the manual pair device command;

receive, via the interface, a second one-time password;

generate, via the processor, a second host CSR and a second user CSR;

transmit, via the transceiver, the second host CSR and the second user CSR to the site controller;

receive, via the transceiver, a second host certificate corresponding to the second host CSR, a second user certificate corresponding to the second user CSR, and a second SSH-CA public key; and store the host certificate, the user certificate, and the second SSH-CA public key in the memory.

6. The point-of-sale device of claim 5, wherein the point-of-sale device is further configured to disable the manual pairing reminder window after the second host certificate, the second user certificate, and the second SSH-CA public key have been stored in the memory.

7. The point-of-sale device of claim 5, wherein the second host CSR is based on the second one-time password.

8. The point-of-sale device of claim 5, wherein the second user CSR is based on the second one-time password.

9. A site controller comprising a memory storing one or more keys corresponding to a legacy communications channel, a processor, and a transceiver, wherein the site controller is configured to:

receive, via the transceiver over the legacy communication channel, a start pairing command from a point-of-sale device;

generate, via the processor, a one-time password upon receiving the start pairing command;

transmit, via the transceiver over the legacy communication channel, the one-time password to the point-of-sale device;

receive, via the transceiver, a host certificate signing request (CSR) and a user CSR from the point-of-sale device;

generate, via the processor, a host certificate based on the host CSR;

generate, via the processor, a user certificate based on the user CSR; and transmit, via the transceiver, the host certificate, the user certificate, and a secure shell certificate authentication (SSH-CA) public key to the point-of-sale device.

10. The site controller of claim 9, wherein the host CSR is based on the one-time password.

11. The site controller of claim 9, wherein the user CSR is based on the one-time password.

12. The site controller of claim 9, wherein the site controller is further configured to:

receive, via the transceiver, a second start pairing command from the point-of-sale device, wherein the second start pairing command corresponds to a user providing a manual pair device command to the point-of-sale device;

generate, via the processor, a second one-time password upon receiving the second start pairing command;

display the second one-time password;

receive, via the transceiver, a second host CSR and a second user CSR from the point-of-sale device;

generate, via the processor, a second host certificate based on the host CSR;

generate, via the processor, a second user certificate based on the user CSR; and transmit, via the transceiver, the second host certificate, the second user certificate, and a second SSH-CA public key to the point-of-sale device.

13. The site controller of claim 12, wherein the second host CSR is based on the second one-time password.

14. The site controller of claim 12, wherein the second user CSR is based on the second one-time password.

15. A method for pairing a point-of-sale device to a site controller, comprising:

transmitting, from the point-of-sale device to the site controller, via a legacy communication channel, a start pairing command;

generating, via the site controller, a one-time password upon receiving the start pairing command;

transmitting, via the legacy communication channel, the one-time password from the site controller to the point-of-sale device;

transmitting, from the point-of-sale device to the site controller, a host certificate signing request (CSR);

transmitting, from the site controller to the point-of-sale device, a host certificate and a secure shell certificate authentication (SSH-CA) public key, wherein the host certificate is based on the host CSR;

transmitting, from the point-of-sale device to the site controller, a user CSR;

transmitting, from the site controller to the point-of-sale device, a user certificate based on the user CSR;

storing, via a memory of the point-of-sale device, the host certificate, the user certificate, and the SSH-CA public key; and removing one or more keys corresponding to the legacy communication channel from the memory of the point-of-sale device.

16. The method of claim 15, wherein the host CSR and the user CSR are based on the one-time password.

17. The method of claim 15, further comprising displaying, via an interface of the point-of-sale device, a manual pairing reminder window after the host certificate, the user certificate, and the SSH-CA public key have been stored in the memory of the point-of-sale device.

18. The method of claim 17, further comprising:

receiving, via the interface, a manual pair device command;

transmitting, from the point-of-sale device to the site controller, a second start pairing command upon receiving the manual pair device command;

generating, via the site controller, a second one-time password upon receiving the second start pairing command;

displaying, via the site controller, the second one-time password;

receiving, via the interface of the point-of-sale device, the second one-time password;

transmitting, from the point-of-sale device to the site controller, a second host CSR;

transmitting, from the site controller to the point-of-sale device, a second host certificate and a second SSH-CA public key, wherein the second host certificate is based on the second host CSR;

transmitting, from the point-of-sale device to the site controller, a second user CSR;

transmitting, from the site controller to the point-of-sale device, a second user certificate based on the user CSR; and storing, via the memory of the point-of-sale device, the second host certificate, the second user certificate, and the second SSH-CA public key.

19. The method of claim 18, wherein the second host CSR and the second user CSR are based on the one-time password.

20. The method of claim 18, further comprising disabling the manual pairing reminder window after the second host certificate, the second user certificate, and the second SSH-CA public key have been stored in the memory of the point-of-sale device.

* * * * *